US008899263B2

(12) United States Patent
Roehner et al.

(10) Patent No.: US 8,899,263 B2
(45) Date of Patent: Dec. 2, 2014

(54) RETURN LINE CONNECTOR

(75) Inventors: Marc Oliver Roehner, Heidelberg (DE);
Paulo Jorge Ferreira Goncalves,
Frankfurt am Main (DE)

(73) Assignee: Robert Bosch GmbH, Stuttgart (DE)

( * ) Notice: Subject to any disclaimer, the term of this patent is extended or adjusted under 35 U.S.C. 154(b) by 507 days.

(21) Appl. No.: 12/958,063

(22) Filed: Dec. 1, 2010

(65) Prior Publication Data
US 2011/0108638 A1 May 12, 2011

Related U.S. Application Data

(63) Continuation-in-part of application No. 11/774,684, filed on Jul. 9, 2007, now abandoned.

(30) Foreign Application Priority Data

Jul. 24, 2006 (DE) .......................... 10 2006 034 114

(51) Int. Cl.
*F16K 15/06* (2006.01)
*F02M 55/00* (2006.01)
*F16K 15/02* (2006.01)
*F16L 41/10* (2006.01)

(52) U.S. Cl.
CPC .............. *F16K 15/025* (2013.01); *F16L 41/10* (2013.01)
USPC ................... 137/543.19; 137/454.5; 123/514; 285/273

(58) Field of Classification Search
USPC ............ 137/114, 454.5, 516.11, 538, 538.11, 137/543.19; 285/273; 123/514, 468
See application file for complete search history.

(56) References Cited

U.S. PATENT DOCUMENTS

| 555,059 | A |   | 2/1896  | Wells |
|---|---|---|---|---|
| 784,534 | A | * | 3/1905  | Bassett .......................... 137/543 |
| 860,820 | A |   | 7/1907  | Norton |
| 1,685,017 | A |   | 9/1928  | Bowman |
| 1,890,223 | A | * | 12/1932 | Kilzer ......................... 137/515.3 |
| 2,649,277 | A |   | 8/1953  | Blackford |
| 2,681,212 | A | * | 6/1954  | Fenley .......................... 261/18.2 |
| 3,272,219 | A | * | 9/1966  | Frantz ............................ 137/112 |
| 3,568,711 | A |   | 3/1971  | Katz |
| 3,845,748 | A | * | 11/1974 | Eisenberg ...................... 123/468 |
| 3,929,109 | A | * | 12/1975 | Chamberlain ................. 123/468 |
| 3,995,658 | A | * | 12/1976 | Hager ............................ 137/543 |
| 4,176,680 | A |   | 12/1979 | De Launay |
| 4,213,434 | A | * | 7/1980  | Vogtmann et al. ............. 123/462 |
| 4,440,135 | A | * | 4/1984  | Asami ............................ 123/467 |
| 4,524,737 | A | * | 6/1985  | Hofman ......................... 123/300 |

(Continued)

FOREIGN PATENT DOCUMENTS

DE    19622757 A1    5/1997
EP     1628056 A1    2/2006

(Continued)

*Primary Examiner* — John Fox
(74) *Attorney, Agent, or Firm* — Michael Best & Friedrich LLP

(57) ABSTRACT

The invention relates to a fuel injection system having a return line connector, having a return inlet and at least two return outlets. To improve the service life of the fuel injection system, a check valve device, which prevents the passage of a fluid from the return outlets to the return inlet is integrated with the return line connector. A return line connector is provided for each fuel injector in the fuel injection system.

6 Claims, 2 Drawing Sheets

(56) References Cited

U.S. PATENT DOCUMENTS

| | | | |
|---|---|---|---|
| 4,815,493 A | 3/1989 | Miller et al. | |
| 5,992,515 A * | 11/1999 | Spiegel | 165/283 |
| 6,622,701 B2 * | 9/2003 | Endo | 123/467 |
| 6,783,337 B2 | 8/2004 | Nelson | |
| 6,827,065 B2 * | 12/2004 | Gottemoller et al. | 123/456 |
| 7,040,300 B2 * | 5/2006 | Jeong | 123/514 |
| 7,226,088 B2 * | 6/2007 | Skiba et al. | 285/92 |
| 2005/0031472 A1 * | 2/2005 | Merz et al. | 417/440 |

FOREIGN PATENT DOCUMENTS

| | | |
|---|---|---|
| GB | 1481061 A | 7/1977 |
| WO | 0133070 A1 | 5/2001 |
| WO | 2005026591 A2 | 3/2005 |

\* cited by examiner

RETURN LINE CONNECTOR

REFERENCE TO RELATED PATENT APPLICATION

This application is a continuation-in-part based on U.S. patent application Ser. No. 11/774,684 filed on Jul. 9, 2007.

BACKGROUND OF THE INVENTION

Field of the Invention

The invention relates to a return line connector having a return inlet and at least two return outlets. The invention further relates to a fuel injection system having a high-pressure fuel reservoir for supplying fuel to fuel injectors that are connected to a return line device. The returning fuel quantity from the fuel injectors is collected and pumped back into a fuel tank via the return line device.

OBJECT AND SUMMARY OF THE INVENTION

The object of the invention is to create a return line connector by which the service life of a fuel injection system can be improved.

In a return line connector, having a return inlet and at least two return outlets, this object is attained in that a check valve device, which prevents the passage of a fluid from the return outlets to the return inlet is integrated with the return line connector. This affords the advantage that reflected pressure waves are not propagated back through the return outlets into a fuel injector connected to the return inlet of the return line connector.

A preferred exemplary embodiment of the return line connector is characterized in that the check valve device includes a check valve body, which as a function of the pressure difference between the return inlet and the return outlets opens a variably sized flow cross section from the return inlet to the return outlets. This offers the advantage that when a defined pressure difference is attained, a flow cross section that is optimal for the flow can be opened.

A further preferred exemplary embodiment of the return line connector is characterized in that the flow cross section opened by the check valve body increases with the pressure difference. As a result, unwanted pressure surges in the return system can be markedly reduced.

A further preferred exemplary embodiment of the return line connector is characterized in that the return line connector has a screwlike base body with a screw-headlike head, at which a sleevelike valve receiving body originates, whose end remote from the head is open and forms the return inlet. The screwlike base body makes it simple to mount the return line connector on or in a cylinder of an internal combustion engine.

A further preferred exemplary embodiment of the return line connector is characterized in that the check valve body is received, such that it is movable back and forth, in the sleevelike valve receiving body. The check valve body is designed such that, depending on its position in the sleevelike receiving body, it opens a more or less large flow cross section from the return inlet to the return outlets.

A further preferred exemplary embodiment of the return line connector is characterized in that between the check valve body and the head of the return line connector, a check valve spring device is disposed in the interior of the sleevelike valve receiving body. Via the spring characteristic of the check valve spring device, the opening performance of the check valve device can be adjusted precisely.

A further preferred exemplary embodiment of the return line connector is characterized in that the sleevelike valve receiving body, between the head and the check valve body, has two through holes, which form the return outlets. Preferably, a connection piece to which return lines can be connected is disposed in the region of the through holes.

A further preferred exemplary embodiment of the return line connector is characterized in that a stop sleeve is secured in the end, remote from the head, of the sleevelike valve receiving body. The stop sleeve forms a sealing seat for the check valve body.

A further preferred exemplary embodiment of the return line connector is characterized in that the sleevelike valve receiving body is provided with a male thread on its end remote from the head. As a result, it becomes possible to fasten the return line connector by means of screwing it in.

In a fuel injection system having a high-pressure fuel reservoir for supplying fuel to fuel injectors that are connected to a return line device, this object is attained in that per fuel injector, the return line device has one above-described return line connector. By means of the return line connector of the invention, the number of pressure peaks in a valve, especially a magnet valve, that is integrated with the fuel injector can be reduced. The maximum intensity of the pressure peaks can furthermore be lessened. As a result, the service life of the valves and hence of the fuel injectors can be increased. Accommodating the check valve device in the return line connector furthermore offers the advantage that the modularity of the fuel injection system is not restricted. In addition, no additional masses that could cause unwanted fluctuations are introduced into the fuel lines. Because the check valve is disposed in the immediate vicinity of the fuel injector, extensive propagation of pressure waves is effectively prevented.

BRIEF DESCRIPTION OF THE DRAWINGS

The invention will be better understood and further objects and advantages thereof will become more apparent from the ensuing detailed description of a preferred embodiment, taken in conjunction with the drawings, in which.

DESCRIPTION OF THE PREFERRED EMBODIMENT

Figure 1:
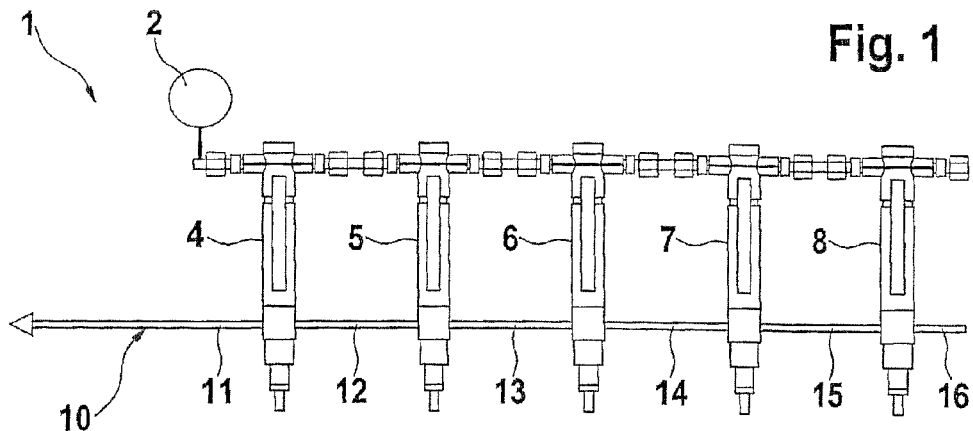
FIG. 1 is a schematic illustration of a fuel injection system in which the return line connector of the invention may be used.

In FIG. 1, a fuel injection system 1 with a central high-pressure fuel reservoir 2, also known as a common rail, is schematically shown. Five fuel injectors 4, 5, 6, 7, 8 are connected to the high-pressure fuel reservoir 2. The fuel injectors 4 through 8 serve to inject fuel into combustion chambers of an internal combustion engine.

The fuel to be injected passes via high-pressure lines from the high-pressure fuel reservoir 2 to the individual fuel injectors 4 through 8. Excess fuel or control leakage is pumped back into a fuel tank via a return line 10. The return line 10 includes six return connection portions 11 through 16. Between each two return connection portions 11 through 16, a respective fuel injector 4 through 8 is connected to the return line 10. Each of the fuel injectors 4 through 8 is connected to the return line 10 via a respective return line connector.

Figure 2:
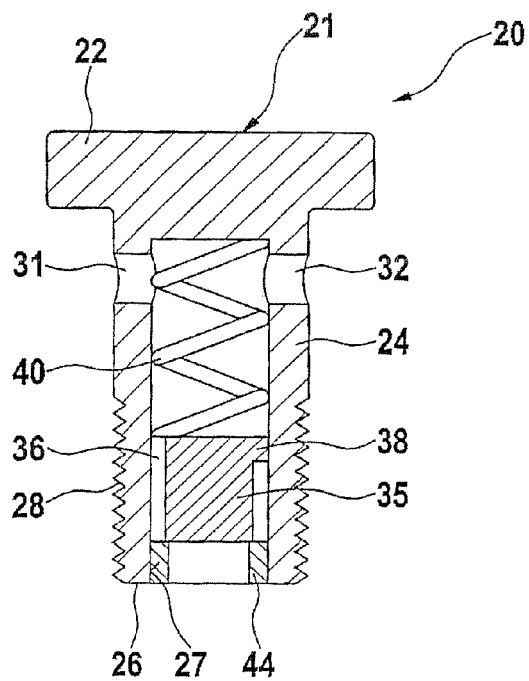
FIG. 2 shows a return line connector of the invention in longitudinal section.

In FIG. 2, a return line connector 20 is shown in longitudinal section. The return line connector 20 includes a screwlike base body 21 with a screw-headlike head 22. The head 22 is in the form of a hexagon. A sleevelike valve receiving body 24 originates at the head 22 and is hollow on the inside and is provided on its free end 26 with an opening 27. The opening 27 forms a return inlet for a fuel injector. In the region of the free end 26, the sleevelike valve receiving body 24 is provided on the outside with a male thread 28. The male thread 28 serves to screw the base body 21 into a hole 29 (shown only schematically in FIG. 3), equipped with a complementary female thread, of a cylinder or cylinder head 46 of the engine.

Between the male thread 28 and the head 22, the sleevelike valve receiving body 24 has two through holes 31, 32. The through holes 31, 32 are disposed in the vicinity of the head 22 and form two return outlets. With the aid of a connection piece, portions of a return line (10 in FIG. 1) can be connected to the return outlets 31, 32.

A valve body 35 is received, such that it is movable back and forth, in the interior of the sleevelike valve receiving body 24. The valve body 35 is also known as a valve piston or valve ball and preferably has a star-shaped cross section. In the longitudinal section shown, it can be seen that the valve body 35 has a longitudinal groove 36, which enables the passage of fuel from the return inlet 27 to the return outlets 31, 32. The valve body 35 does not have merely a single longitudinal groove 36 but rather a plurality of longitudinal grooves, which are distributed uniformly over the circumference of the valve body 35, producing the preferred star-shaped cross section.

On its end toward the head 22, the valve body 35 has a collar 38, which is interrupted by the longitudinal grooves 36. A check valve spring 40 is fastened between the valve body 35 and the head 22. The end of the valve body 35 remote from the head 22 contacts a stop sleeve 44, which is press-fitted into the opening 27 on the free end 26 of the base body. The stop sleeve 44 forms a stop and a sealing seat for the valve body 35.

Figure 3:
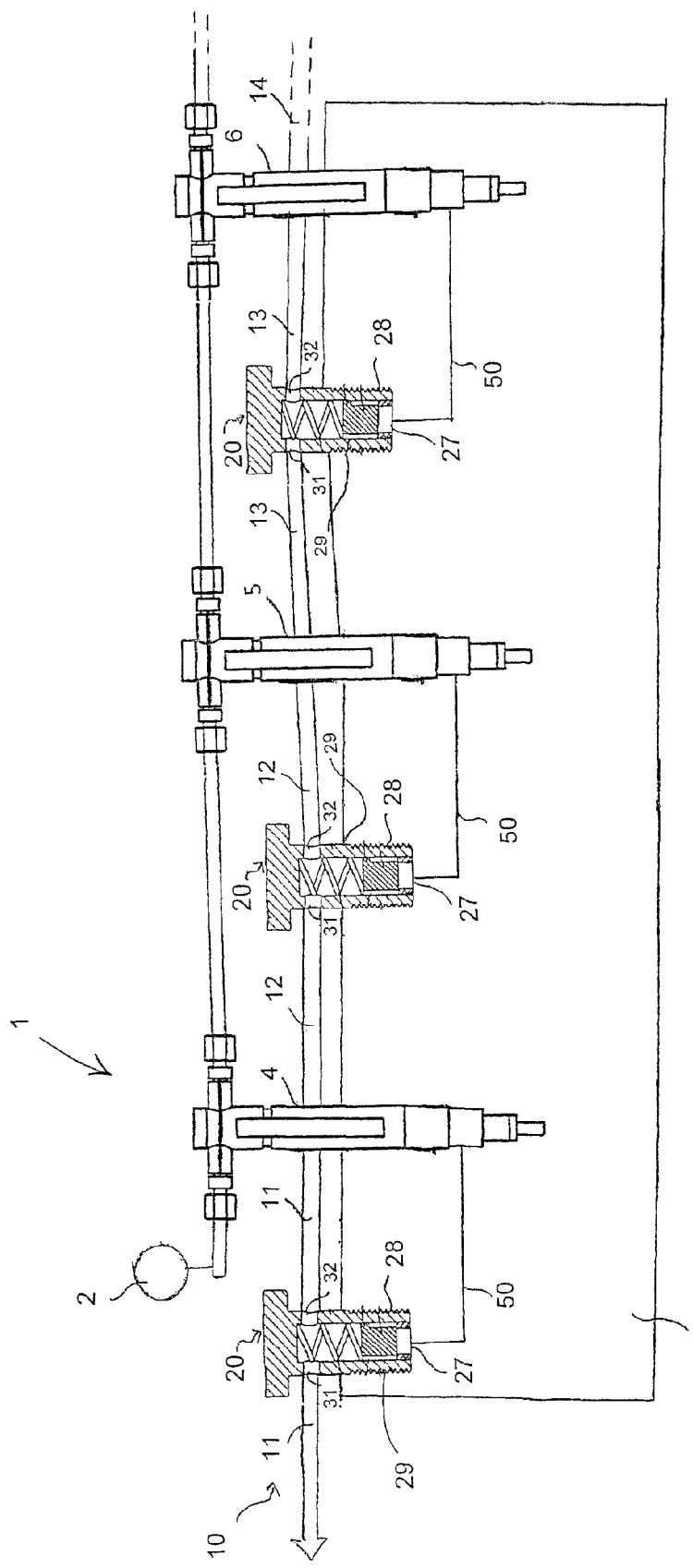
FIG. 3 shows the return line connectors being connected to the fuel injectors and being disposed in a return line of the fuel injection system

FIG. 3 shows the connection of the fuel injectors 4 through 6 to the return line 10 via return line connection devices 20 that are assigned to the respective fuel injectors 4 through 6. The connection of the further fuel injectors 7 and 8 is done in the same way and is not shown in FIG. 3 for reasons of space.

The return line connection devices 20 are screwed into holes the cylinder or the cylinder head 46. The through holes 31 and 32 of the return line connection devices 20 communicate with the return connection portions 11 through 13. The return connection portions 11 through 13 communicate directly with the through holes 31, 32, where they have an interruption. Fuel from the part of the return connection portion 11 oriented toward the injector 4 reaches the interior of the return line connection devices 20 via the through hole 31 and, through the through hole 32, it reaches the part of the return connection portion 11 remote from the injector 4. Via the return line 10, fuel is fed back into the fuel tank.

For example, the fuel injector 4 will be considered below; the procedure described is effected precisely the same way for the other injectors, but the reference numerals have to be adapted. Excess fuel from the fuel injector 4 or control leak fuel from the fuel injector 4 passes via a line 50 from the fuel injector 4 to reach the opening 27, which forms the return inlet of the return line connection devices 20. Depending on the fuel pressure in the line 50, the valve body 35 moves upward and opens up a communication between the line 50 and the return connection portion 11. As a result of the opened communication, excess fuel from the fuel injector 4 or control leak fuel from the fuel injector 4 can reach the return connection portion 11 via the through holes 31 and 32 and proceed onward to reach the fuel tank.

The foregoing relates to a preferred exemplary embodiment of the invention, it being understood that other variants and embodiments thereof are possible within the spirit and scope of the invention, the latter being defined by the appended claims.

We claim:

1. A fuel injection system having a high-pressure fuel reservoir for supplying fuel to fuel injectors that are connected to a return line device for directing excess fuel away from the fuel injectors,
   the return line device comprising one return line connector attached to each of the fuel injectors, wherein each of the return line connectors are disposed in a return line of the fuel injection system and comprises:
   a return inlet communicating with a respective one of the fuel injectors,
   at least two through holes each connected to a respective portion of the return line,
   a stop sleeve, and
   a check valve device integrated with the return line connector, the check valve device having a check valve body and being located between the return inlet and the through holes and preventing the passage of a fluid from the at least two through holes to the return inlet,
   wherein each of the return line connectors has a screwlike base body with a screw-headlike head at which a sleevelike valve receiving body originates and whose end remote from the head is open and forms the return inlet, and the through holes are formed in the sleevelike valve receiving body between the head and the check valve body,
   wherein each return line connector extends through the corresponding return line to establish fluid communication between the return line and the through holes, while the end of the base body remote from the head is inserted in and coupled to one of a cylinder and a cylinder head, and
   wherein the stop sleeve is secured in the end, remote from the head, of the sleevelike valve receiving body.

2. The fuel injection system as defined by claim 1, wherein the check valve body, as a function of a pressure difference between the return inlet and the at least two through holes, opens a variably sized flow cross section from the return inlet to the at least two through holes.

3. The fuel injection system as defined by claim 2, wherein the flow cross section opened by the check valve body increases with the pressure difference.

4. The fuel injection system as defined by claim 1, wherein the check valve body is received, such that it is movable back and forth, in the sleevelike valve receiving body.

5. The fuel injection system as defined by claim 4, further comprising a check valve spring device disposed in an interior of the sleevelike valve receiving body between the check valve body and the head of the return line connector.

6. The fuel injection system as defined by claim 1, wherein the sleevelike valve receiving body comprises a male thread on its end remote from the head which is screwed into one of the cylinder and the cylinder head.

* * * * *